A. MALMROS.
THRESHING MACHINE.
APPLICATION FILED MAY 3, 1916.

1,254,422.

Patented Jan. 22, 1918.
5 SHEETS—SHEET 1.

Inventor:
August Malmros
By George Bayard Jones
Atty.

A. MALMROS.
THRESHING MACHINE.
APPLICATION FILED MAY 3, 1916.

1,254,422.

Patented Jan. 22, 1918.
5 SHEETS—SHEET 2.

Inventor:
August Malmros
By George Bayard Jones
Atty.

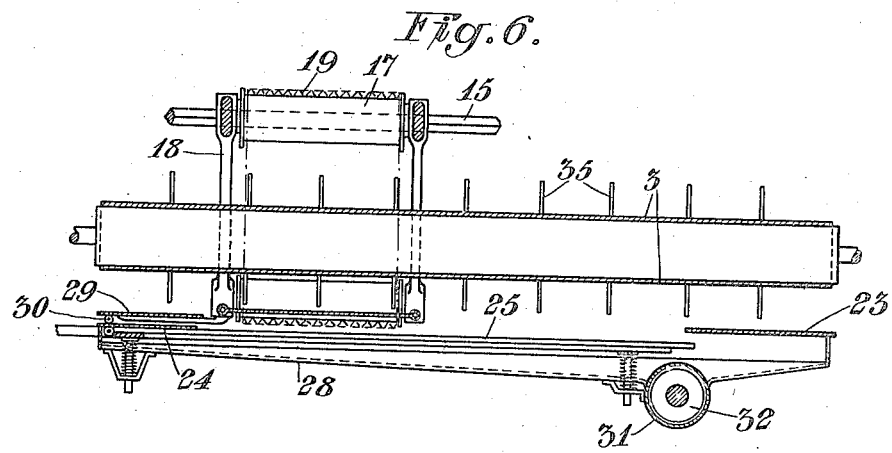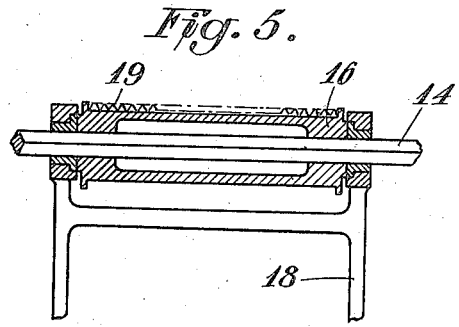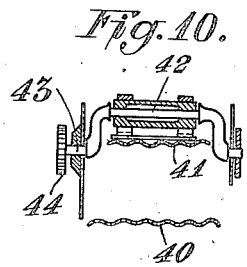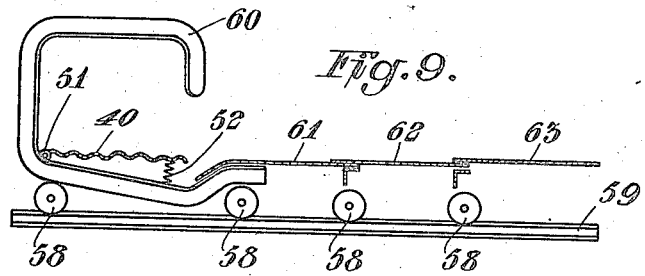

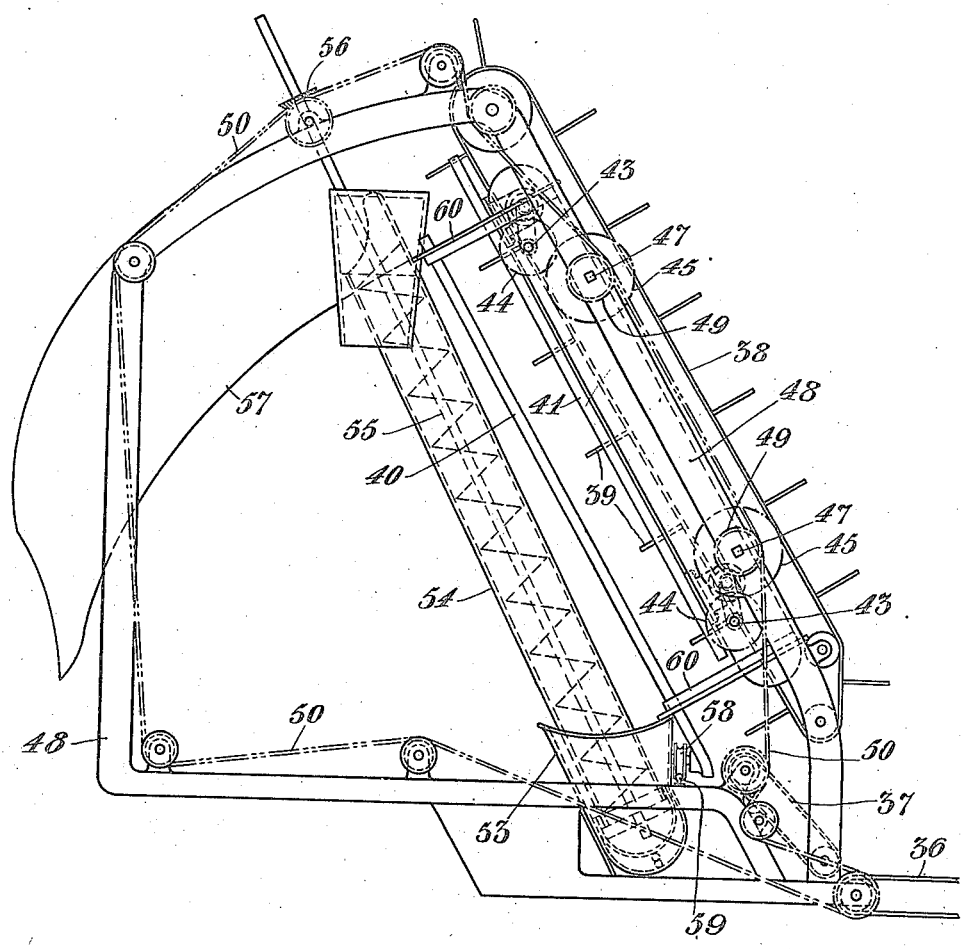

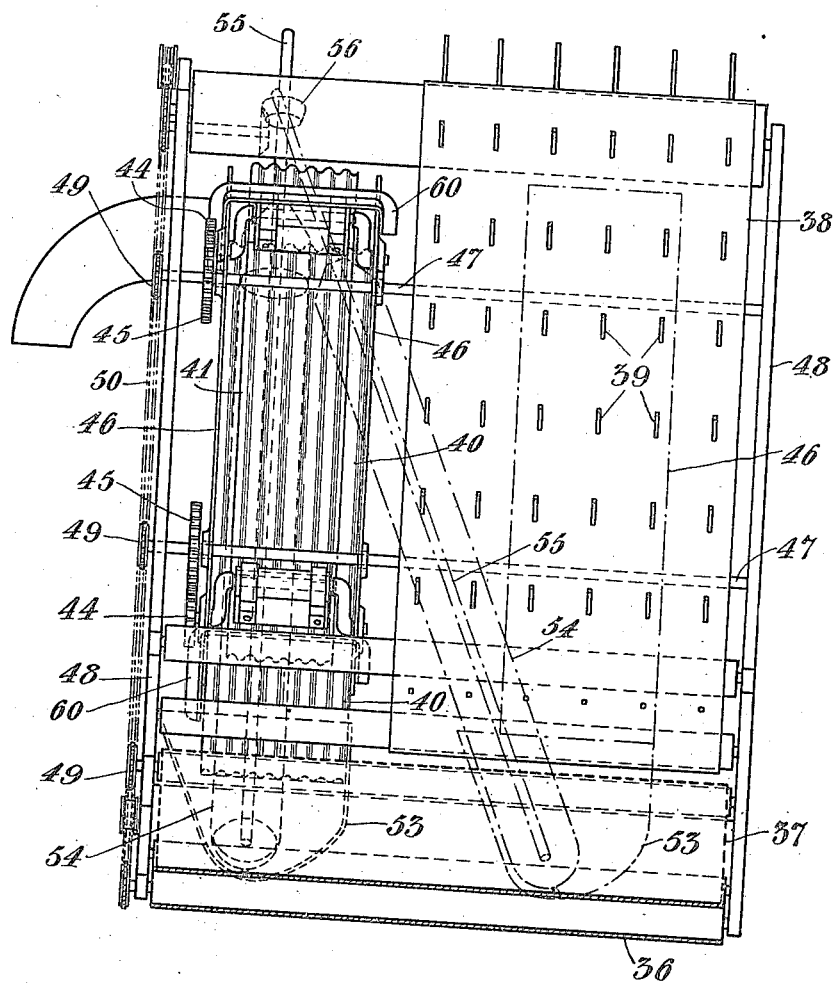

UNITED STATES PATENT OFFICE.

AUGUST MALMROS, OF RÖNNINGE, SWEDEN.

THRESHING-MACHINE.

1,254,422.

Specification of Letters Patent. Patented Jan. 22, 1918.

Application filed May 3, 1916. Serial No. 95,068.

*To all whom it may concern:*

Be it known that I, AUGUST MALMROS, a subject of the King of Sweden, residing at Rönninge, in the Kingdom of Sweden, have invented a new and useful Improvement in Threshing-Machines, of which the following is a specification.

This invention relates to an arrangement in such combined harvesting and threshing machines in which the cut crop falls on a conveyer cloth or the like which carries the crop to a threshing apparatus consisting of cloths, sieves, or the like movable relatively to one another, between which the crop is introduced by means of a suitable elevator device in such manner that the threshing apparatus treats the ears.

The invention is broadly characterized by this that the threshing apparatus is movable in the longitudinal direction of the straw passing through the apparatus, for the purpose of making the machine adjustable for crops of different heights.

Figure 1:
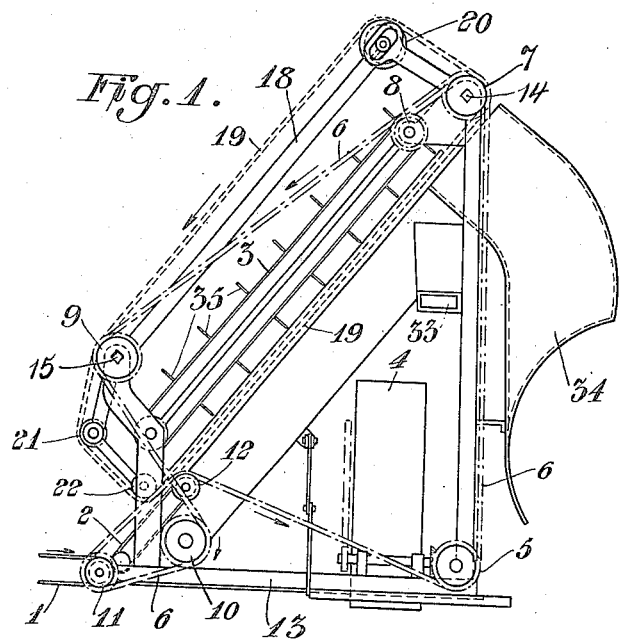
Figure 2:
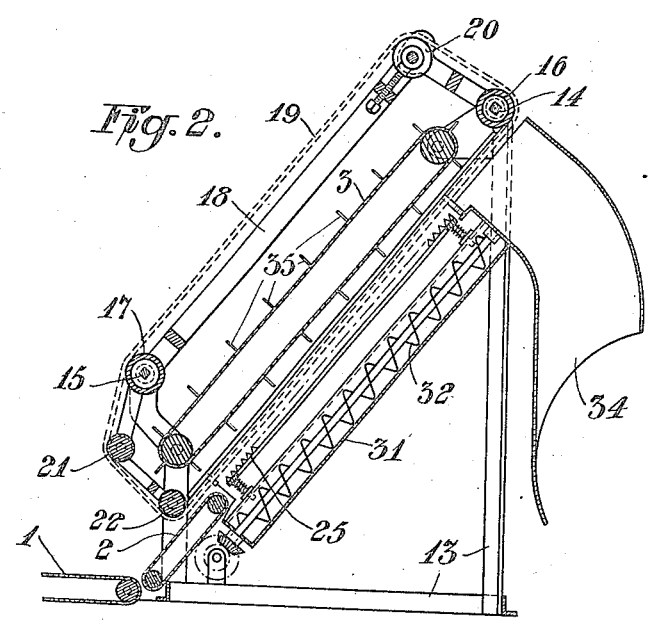
Figure 3:
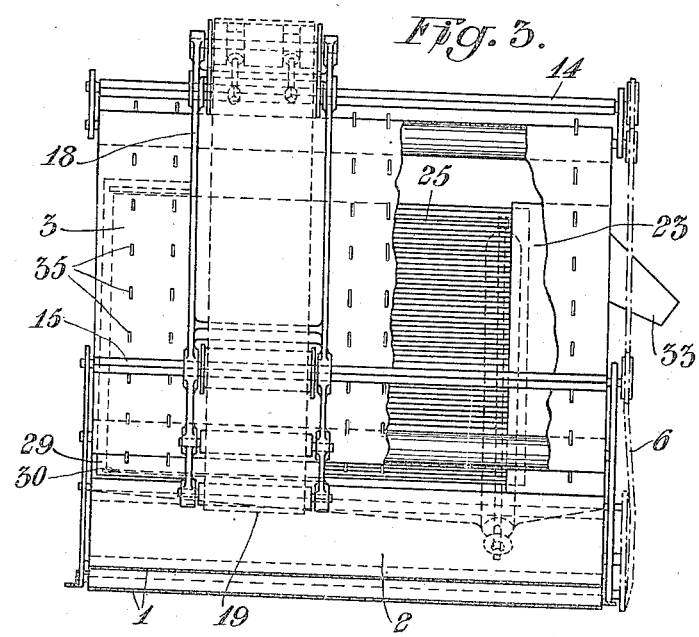
Figure 4:
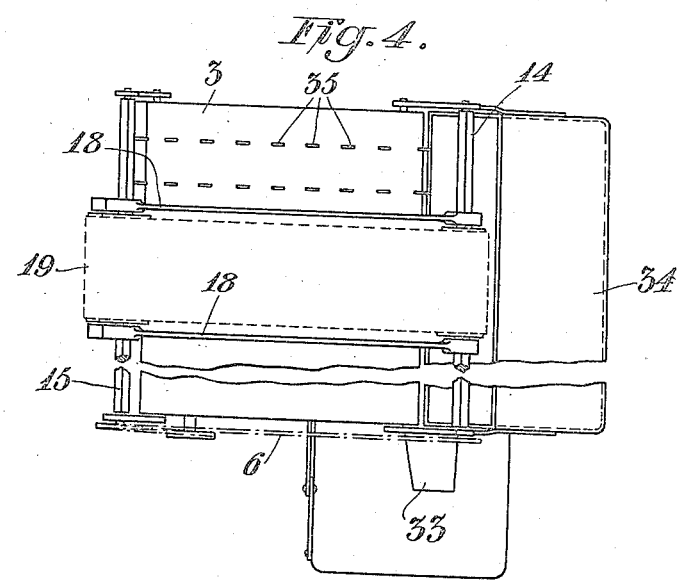

In the accompanying drawings two embodiments of the present invention are shown by way of example. Figure 1 shows a machine according to the one embodiment viewed from the rear. Fig. 2 shows a section of the threshing apparatus and the elevator of the same machine. Fig. 3 shows the threshing apparatus viewed from the side, and Fig. 4 the same viewed from above. Fig. 5 illustrates a detail of the threshing apparatus, and Fig. 6 shows the threshing apparatus viewed from below. Fig. 7 shows a modified embodiment of the machine viewed from the rear, and Fig. 8 shows a side view of the same. Figs. 9 and 10 illustrate details of the threshing apparatus.

Referring to the embodiment illustrated in Figs. 1 to 6, 1 denotes the cloth on which the cut crop falls and which feeds the crop to the elevator cloth 2 continuously. From the cloth 2 the crop is transported up an inclined plane by means of a conveyer cloth 3 provided with fingers 35. All these parts receive motion from the wheel 4 of the machine, connected by means of suitable gearing with a sprocket wheel 5 for a chain 6. This chain engages and drives other sprocket wheels 7, 8, 9, 10, 11, and 12, the wheel 8 of which drives the conveyer cloth 3, the wheel 11 drives the cloth 1 and the wheel 12 drives the elevator cloth 2. All these wheels are journaled in the machine frame 13. The wheels 7 and 9 are mounted on and secured to square shafts 14 and 15 journaled in the frame, on which shafts rollers 16 and 17 for a cloth 19 mounted in a frame 18, are sliding. This frame 18 may thus be moved forward and backward on the shafts 14 and 15 along the frame 13. This arrangement thus enables the threshing apparatus to be adjusted transversely for different lengths of the straw.

The cloth 19 is driven by the rollers 16 and 17 around rollers 20, 21, and 22 which are mounted in the frame 18 in such manner that the cloth 19 runs outside the conveyer cloth 3 parallel with the same and with the inclined plane up over which the cut crop is moved by the conveyer cloth. This inclined plane consists at the forward end of a fixed plate 24 and at the rearward end of a loose plate 23. Below these plates there is a sieve 25 or the like, resiliently mounted. This sieve is movable forward and backward in a direction at right angles to the direction of movement of the crop conveyed over the same, motion being transmitted to the sieve from the wheel 4 by means of suitable gearings. The sieve 25 is somewhat below the plane of the plate 24. A plate 29 is secured to the frame 18 in a plane above the plate 24, hence it may be slid over this plate. The plate 29 moves over the sieve 25 supported on suitable wheels 30. The bottom 28 inclines from both side edges toward a channel 31 in which there is a screw conveyer 32 driven from the wheel 10 and communicating at its upper end with a discharge chute 33 for the threshed grain. Another discharge chute 34 for the straw is also provided on the frame 13.

When using the machine the frame 18 is adjusted on the shafts 14 and 15 at such distance from the plate 24 that when the cut crop is transported from the cloth 1 over the elevator cloth 2 by the conveyer cloth 3 up over the plate 29—or the plate 24—with the root ends on the plate, the ears pass between the sieve 25 and the cloth 19. The cloth 19 moves with greater speed than the conveyer cloth 3. The sieve 25 underneath the ears meanwhile moves forward and backward at right angles to the direction of movement of the cloth 19. The ears between the cloth and the sieve thus become subjected to a rubbing action owing to which the grain becomes separated. The grain falls through the sieve on to the bottom and slides on this bottom toward the channel 31 whereafter it is conveyed by the elevator screw 32 to the chute 33 where it is collected in a bag placed below the chute. The threshed straw is transported by the conveyer cloth 3 up to the discharge chute 34.

The embodiment shown in Figs. 7–10 differs from the one described above mainly in this that the threshing of the crop is effected during the repeated movement toward and away from each other of the threshing members, whereby the crop is alternately pressed together and released by the members and subjected to rubbing between the same when pressed together. By thus subjecting the crop to intermittent pressure and simultaneous rubbing the threshing becomes more thorough and there is less danger of the grain becoming damaged.

The embodiment according to Figs. 7–10 is further characterized by a different arrangement of the elevator for transporting the threshed grain up to the bag. This different arrangement is mainly characterized by this that the elevator is movable at or near its upper end and movably connected at its lower end with the threshing apparatus so that it follows the same when the threshing apparatus is moved for adjustment according to different heights of the crop. By this arrangement the machine is materially simplified as the bottom 28, shown in Figs. 1–6, which is provided with the slanting planes adapted to conduct the threshed grain to the elevator, may be dispensed with.

36 denotes an endless cloth or the like back of the cutting apparatus of the machine for receiving the cut crop and for moving the same toward the threshing apparatus, where it is caught by the endless cloth 37 which moves the crop upward so that it may be seized by the fingers 39 projecting from the cloth 38, which transport the crop upward between the threshing members 40 and 41. The member 40 is stationary, and the member 41 is supported by cranks 42 (Fig. 10) on shafts 43 provided with pinions 44 meshing with gear wheels 45 journaled in the threshing apparatus 46 and sliding but not turning on shafts 47, which are journaled in the side frames 48 of the machine. Sprocket wheels 49 in engagement with the driving chain 50, are secured to the shafts 47.

By means of the driving chain motion is thus transmitted to the cranks 42 which are made to rotate with the threshing member 41 so that this member is moved toward and away from the stationary member 40 and thus strikes or presses on and at the same time rubs the crop fed upward between the threshing members.

The stationary threshing member or members as well as the movable member or members may consist of undulated sheet metal, the one forming the member 40 being provided with a sufficient number of openings for the threshed grain to fall through. Each member may be made in some other manner, however, as for instance of suitably spaced parallel plates or strips, or the members may consist of netting or the like.

According to Fig. 9 the lower member is suitably secured at one edge to hinges 51 and is supported at the other edge by springs 52 owing to which the member becomes resilient to high pressure to the requisite extent. The grain together with the husk and chaff fall down into a box 53 at or near the lower end of the member 40. In the bottom of this box there is movably secured in suitable manner the lower end of the elevator 54, the shaft 55 of which is movably connected by means of a suitable device with the gear 56, which serves for transmitting motion to the elevator, in such manner that the shaft may be swung as well as moved in axial direction relatively to the gear when the elevator occupies an inclined position at the adjustment of the threshing apparatus, as shown in dotted and dashed lines in Fig. 8. The elevator is thus able to transport the grain from the box 53 in any position of the threshing apparatus. The grain is delivered to the chute 57 which delivers the said grain to a bag or the like.

The threshing apparatus rests by means of rollers 58 on a rail 59 secured to the machine frame. The brackets 60 (Fig. 9) which together with the side plates 46 form the frame of the threshing apparatus, are connected with a bottom below and behind the same, which bottom as shown in Fig. 9 consists of a number of parts 61, 62, and 63 movable relatively to each other, the part 61 of which is rigidly connected with the brackets 60 and whose outer edge forms a support for the inner edge of the plate 62 loosely resting on the same, the plate 62 in its turn forming with its outer edge a support for the inner edge of the plate 63 loosely resting on the same, and so forth. The bottom may thus easily be shut together or drawn out, according as the threshing apparatus 46 is moved or adjusted.

Having now described my invention and how it may be carried out, what I claim and desire to secure by Letters Patent is:

1. In a threshing machine, the combination of a conveyer cloth for receiving the cut crop and for transporting the same in a direction substantially perpendicular to its longitudinal direction, a threshing apparatus at the discharge end of the conveyer cloth and adjustable in the longitudinal direction of the cut crop on the cloth, and transversely to the feeding direction of said cloth and an elevator device for transporting the crop approximately parallel to itself and in a direction substantially perpendicular to its longitudinal direction through the threshing apparatus in such manner that chiefly the ears become treated by the threshing apparatus, substantially as and for the purpose set forth.

2. In a threshing machine, the combination of a conveyer cloth for receiving the cut crop and for transporting the same in a direction substantially perpendicular to its longitudinal direction, a machine frame, rotating shafts journaled in said frame, a threshing apparatus at the discharge end of the conveyer cloth and adjustable in the longitudinal direction of the cut crop on the cloth and transversely to the feeding direction of said cloth, said threshing apparatus comprising a sieve, a frame, rollers journaled in said frame sliding on and rotating with the said rotating shafts, and an endless cloth on said rollers coöperating with the sieve, and an elevator device for transporting the crop approximately parallel to itself and in a direction substantially perpendicular to its longitudinal direction through the threshing apparatus in such manner that the ears become treated between the sieve and the threshing cloth, substantially as and for the purpose set forth.

3. In a threshing machine, a conveyer cloth for receiving the cut crop and for transporting the same in a direction substantially perpendicular to its longitudinal direction, a machine frame, rotating shafts journaled in said frame, a threshing apparatus at the discharge end of the conveyer cloth and adjustable in the longitudinal direction of the cut crop on the cloth and transversely to the feeding direction of said cloth, said threshing apparatus comprising a sieve, a frame, rollers journaled in said frame sliding on and rotating with the said rotating shafts, and an endless cloth on said rollers coöperating with the sieve, rollers journaled in the machine frame, and an endless elevator cloth on said rollers provided with projecting fingers for seizing the crop and transporting the same approximately parallel to itself and in a direction substantially perpendicular to its longitudinal direction through the threshing apparatus in such manner that the ears become treated between the sieve and the threshing cloth, substantially as and for the purpose set forth.

4. In a threshing machine, the combination of a conveyer cloth for receiving the cut crop and for transporting the same in a direction substantially perpendicular to its longitudinal direction, a machine frame, rotating shafts journaled in said frame, a threshing apparatus at the discharge end of the conveyer cloth and adjustable in the longitudinal direction of the cut crop on the cloth and transversely to the feeding direction of said cloth, said threshing apparatus comprising a sieve, a frame, rollers journaled in said frame sliding on and rotating with the said rotating shafts, and an endless cloth on said rollers coöperating with the sieve, an elevator device for transporting the crop approximately parallel to itself and in a direction substantially perpendicular to its longitudinal direction through the threshing apparatus in such manner that the ears become treated between the sieve and the threshing cloth, a bottom underneath said sieve, a channel in said bottom, and an elevator screw in said channel, substantially as and for the purpose set forth.

5. In a threshing machine, the combination of a conveyer cloth for receiving the cut crop and for transporting the same in a direction substantially perpendicular to its longitudinal direction, a threshing apparatus at the discharge end of the conveyer cloth and adjustable in the longitudinal direction of the cut crop on the cloth and transversely to the feeding direction of said cloth, said threshing apparatus comprising two members one of which is movable toward and away from the other, and an elevator device for transporting the crop approximately parallel to itself and in a direction substantially perpendicular to its longitudinal direction through the threshing apparatus in such manner that the ears become treated by the threshing members, substantially as and for the purpose set forth.

6. In a threshing machine, the combination of a conveyer cloth for receiving the cut crop and for transporting the same in a direction substantially perpendicular to its longitudinal direction, a threshing apparatus at the discharge end of the conveyer cloth and adjustable in the longitudinal direction of the cut crop on the cloth and transversely to the feeding direction of said cloth, said threshing apparatus comprising a frame, a threshing member secured to said frame, cranks journaled in said frame, and a second threshing member attached to said cranks so as to be swingable toward and away from the first-named threshing member, and an elevator device for transporting the crop approximately parallel to itself and in a direction substantially perpendicular to its longitudinal direction through the threshing apparatus in such manner that the ears become treated by the threshing members, substantially as and for the purpose set forth.

7. In a threshing machine, the combination of a conveyer cloth for receiving the cut crop and for transporting the same in a direction substantially perpendicular to its longitudinal direction, a threshing apparatus at the discharge end of the conveyer cloth and adjustable in the longitudinal direction of the cut crop on the cloth and transversely to the feeding direction of said cloth, said threshing apparatus comprising a frame, a threshing member hinged at one edge to said frame, springs in said frame supporting the opposite edge of said threshing member, cranks journaled in said frame, and a second threshing member attached to said cranks so as to be swingable toward and away from the first-named threshing member, and an elevator device for transporting the crop approximately parallel to itself and in a direction substantially perpendicular to its longitudinal direction through the threshing apparatus in such manner that the ears become treated by the threshing members, substantially as and for the purpose set forth.

8. In a threshing machine, the combination of a conveyer cloth for receiving the cut crop and for transporting the same in a direction substantially perpendicular to its longitudinal direction, a threshing apparatus at the discharge end of the conveyer cloth and adjustable in the longitudinal direction of the cut crop on the cloth and transversely to the feeding direction of said cloth, said threshing apparatus comprising two members one of which is movable toward and away from the other, an elevator device for transporting the crop approximately parallel to itself and in a direction substantially perpendicular to its longitudinal direction through the threshing apparatus in such manner that the ears become treated by the threshing members, a box at the lower end of the threshing apparatus for receiving the threshed grain, an elevator movably connected at its lower end with the said box, and means at the upper end of the elevator for transmitting motion to the elevator in any position of the same, substantially as and for the purpose set forth.

9. In a threshing machine, the combination of a conveyer cloth for receiving the cut crop and for transporting the same in a direction substantially perpendicular to its longitudinal direction, a threshing apparatus at the discharge end of the conveyer cloth and adjustable in the longitudinal direction of the cut crop on the cloth and transversely to the feeding direction of said cloth, said threshing apparatus comprising two members one of which is movable toward and away from the other, an elevator device for transporting the crop approximately parallel to itself and in a direction substantially perpendicular to its longitudinal direction through the threshing apparatus in such manner that the ears become treated by the threshing members, a bottom projecting from said threshing apparatus, said bottom comprising a number of overlapping plates movable relatively to each other, one of said plates being secured to the threshing apparatus, substantially as and for the purpose set forth.

AUGUST MALMROS.

Copies of this patent may be obtained for five cents each, by addressing the "Commissioner of Patents, Washington, D. C."